US012094228B2

United States Patent
Liu et al.

(10) Patent No.: US 12,094,228 B2
(45) Date of Patent: Sep. 17, 2024

(54) METHOD OF IDENTIFYING LEVEL OF DONENESS OF FOOD, DEVICE, AND COMPUTER STORAGE MEDIUM

(71) Applicants: Guangdong Midea White Home Appliance Technology Innovation Center Co., Ltd., Foshan (CN); Midea Group Co., Ltd., Foshan (CN)

(72) Inventors: Sanjun Liu, Foshan (CN); Yusheng Li, Foshan (CN); Linnan Zhu, Foshan (CN)

(73) Assignees: GUANGDONG MIDEA WHITE HOME APPLIANCE TECHNOLOGY INNOVATION CENTER CO., LTD, Foshan (CN); MIDEA GROUP CO., LTD, Foshan (CN)

(*) Notice: Subject to any disclaimer, the term of this patent is extended or adjusted under 35 U.S.C. 154(b) by 377 days.

(21) Appl. No.: 17/738,761

(22) Filed: May 6, 2022

(65) Prior Publication Data
US 2022/0262143 A1    Aug. 18, 2022

Related U.S. Application Data

(63) Continuation of application No. PCT/CN2020/133452, filed on Dec. 2, 2020.

(30) Foreign Application Priority Data

Dec. 6, 2019 (CN) .......................... 201911245147.6

(51) Int. Cl.
G06V 20/68    (2022.01)
G06T 7/73    (2017.01)
(Continued)

(52) U.S. Cl.
CPC ................ *G06V 20/68* (2022.01); *G06T 7/73* (2017.01); *G06V 10/26* (2022.01); *G06V 10/766* (2022.01); *G06V 10/803* (2022.01); *G06V 10/82* (2022.01)

(58) Field of Classification Search
CPC ...... G06V 20/68; G06V 10/26; G06V 10/766; G06V 10/803; G06V 10/82; G06V 10/267;
(Continued)

(56) References Cited

U.S. PATENT DOCUMENTS 10,074,028 B2* 9/2018 Gupta .................... G06F 18/253
10,819,905 B1* 10/2020 Liu .......................... H04N 23/80
(Continued)

FOREIGN PATENT DOCUMENTS

| CN | 102183215 A | 9/2011 |
| CN | 102591215 A | 7/2012 |

(Continued)

OTHER PUBLICATIONS

Midea Group Co., Ltd., ISR, PCT/CN2020/133452, Mar. 3, 2021, 3 pgs.
(Continued)

*Primary Examiner* — Mahendra R Patel
(74) *Attorney, Agent, or Firm* — Morgan, Lewis & Bockius LLP

(57) ABSTRACT

A method of identifying a level of doneness of food includes: obtaining an initial food detection image; obtaining a current food detection image; performing a differential fusion operation on the initial food detection image and the current food detection image to obtain a fused food detection image; and inputting the fused food detection image into a predetermined neural network model to obtain the level of doneness of food output by the predetermined neural net-
(Continued)

work model. According to the method, the differential image fusion is performed to reduce an influence on determining the level of doneness of food caused by the initial food detection image, and costs of the device may be reduced.

17 Claims, 4 Drawing Sheets

(51) Int. Cl.
*G06V 10/26* (2022.01)
*G06V 10/766* (2022.01)
*G06V 10/80* (2022.01)
*G06V 10/82* (2022.01)

(58) Field of Classification Search
CPC ........ G06V 10/56; G06V 10/774; G06T 7/73; G06F 18/251
USPC ......................................................... 382/110
See application file for complete search history.

(56) References Cited

U.S. PATENT DOCUMENTS

| | | | |
|---|---|---|---|
| 2012/0224055 A1 | 9/2012 | Yokozaki et al. | |
| 2016/0063734 A1* | 3/2016 | Divakaran | G06V 10/50 382/110 |
| 2018/0184668 A1* | 7/2018 | Stork genannt Wersborg | F24C 7/087 |
| 2018/0247417 A1* | 8/2018 | Mutti | G06V 10/811 |
| 2018/0292092 A1* | 10/2018 | Bhogal | F24C 7/085 |
| 2018/0324908 A1* | 11/2018 | Denker | H05B 6/6467 |
| 2019/0041842 A1* | 2/2019 | Cella | G05B 23/0264 |
| 2019/0293620 A1* | 9/2019 | Farkas | G01N 21/3563 |
| 2020/0117954 A1* | 4/2020 | Jiang | G06V 10/17 |

FOREIGN PATENT DOCUMENTS

| | | | | |
|---|---|---|---|---|
| CN | 203191327 U | | 9/2013 | |
| CN | 104042124 A | | 9/2014 | |
| CN | 104166396 A | | 11/2014 | |
| CN | 105466951 A | | 4/2016 | |
| CN | 105554477 A | | 5/2016 | |
| CN | 105894048 A | * | 8/2016 | |
| CN | 205539242 U | | 8/2016 | |
| CN | 106557954 A | | 4/2017 | |
| CN | 106839268 A | | 6/2017 | |
| CN | 106897661 A | * | 6/2017 | ......... G06F 19/3475 |
| CN | 107389701 A | | 11/2017 | |
| CN | 107422645 A | | 12/2017 | |
| CN | 107504656 A | | 12/2017 | |
| CN | 107595102 A | * | 1/2018 | |
| CN | 107692840 A | | 2/2018 | |
| CN | 107806656 A | | 3/2018 | |
| CN | 107860096 A | | 3/2018 | |
| CN | 107894074 A | | 4/2018 | |
| CN | 108006898 A | | 5/2018 | |
| CN | 108364675 A | | 8/2018 | |
| CN | 108491377 A | | 9/2018 | |
| CN | 208015766 U | | 10/2018 | |
| CN | 108896554 A | | 11/2018 | |
| CN | 108916959 A | * | 11/2018 | .......... F24C 15/2021 |
| CN | 108954722 A | | 12/2018 | |
| CN | 109002850 A | | 12/2018 | |
| CN | 109034169 A | * | 12/2018 | .......... G06K 9/4642 |
| CN | 109631486 A | | 4/2019 | |
| CN | 109886555 A | * | 6/2019 | |
| CN | 109998360 A | * | 7/2019 | ............... A23L 5/10 |
| CN | 110826574 A | * | 2/2020 | |
| CN | 110956217 A | | 4/2020 | |
| JP | H 03271625 A | | 12/1991 | |
| JP | 2013164834 A | | 8/2013 | |
| WO | WO-2015185211 A2 * | | 12/2015 | ............... A21B 1/40 |
| WO | WO-2018165038 A1 * | | 9/2018 | ............... A23L 5/10 |
| WO | WO-2018165605 A1 * | | 9/2018 | ........... A61B 5/0075 |
| WO | WO-2018189309 A1 * | | 10/2018 | ........ G01N 21/3581 |

OTHER PUBLICATIONS

Midea Group Co., Ltd., 1st Chinese Office Action, CN Patent Application No. 201911245147.6, Jan. 19, 2023, 13 pgs.
Midea Group Co., Ltd., 2nd Chinese Office Action, CN Patent Application No. 201911245147.6, May 24, 2023, 11 pgs.
Midea Group Co., Ltd., Extended European Search Report and Supplementary Search Report, EP20895039.4, Oct. 12, 2022, 10 pgs.
Midea Group Co., Ltd., Japanese Office Action, JP Patent Application No. 2022-523214, Feb. 7, 2023, 6 pgs.
Midea Group Co., Ltd., Japanese Decision to Grant, JP Patent Application No. 2022-523214, Jun. 13, 2023, 5 pgs.
Midea Group Co., Ltd., WO, PCT/CN2020/133452, Mar. 3, 2021, 5 pgs.
Midea Group Co., Ltd., IPRP, PCT/CN2020/133452, May 17, 2022, 6 pgs.
Marion O'Farrell et al., "Design of a System That Uses Optical-Fiber Sensors and Neural Networks to Control a Large-Scale Industrial Oven by Monitoring the Food Quality Online", IEEE Sensors Journal, vol. 5, No. 6, Dec. 1, 2005, XP001512962, 14 pgs.

* cited by examiner

METHOD OF IDENTIFYING LEVEL OF DONENESS OF FOOD, DEVICE, AND COMPUTER STORAGE MEDIUM

CROSS REFERENCE TO RELATED APPLICATIONS

This application is a continuation application of International Application No. PCT/CN2020/133452, filed on Dec. 2, 2020, which claims the benefit of Chinese Patent Application No. 201911245147.6, filed on Dec. 6, 2019, entitled "METHOD OF IDENTIFYING LEVEL OF DONENESS OF FOOD, DEVICE, AND COMPUTER STORAGE MEDIUM", with the China National Intellectual Property Administration, the entire contents of which are hereby incorporated by reference in their entireties.

TECHNICAL FIELD

The present disclosure relates to the field of intelligent cooking device, and in particular to a method of identifying a level of doneness of food, a device, and a computer storage medium.

BACKGROUND

With the development of technology, intelligent cooking devices, such as ovens, are becoming more and more popular in ordinary homes, greatly facilitating daily lives. However, taking the ovens as an example, for the vast majority of ovens on the market, users cannot be informed of any condition of the food while using the ovens. To solve this problem, some ovens are configured with probes to monitor internal temperatures of the. However, insertion and cleaning of the probes cannot be easily performed, and the temperatures detected may vary greatly depending on locations where the probes are inserted. Therefore, accuracy and consistency of the temperature detection cannot be achieved. Some ovens apply a hyperspectral imaging technology to determine a level of doneness of the food based on color texture of a surface of the food. A problem of these ovens is that obtaining the hyperspectral images may require expensive devices, and it is difficult to guarantee accuracy when determining the level of doneness of the food based on the color texture of the surface of the food alone.

SUMMARY OF THE DISCLOSURE

The present disclosure provides a method of identifying a level of doneness of food, a device, and a computer storage medium, to solve the problem of low accuracy and high hardware cost of the method for identifying the level of doneness of the food in the art.

The present disclosure provides a method of identifying a level of doneness of food. The method includes: obtaining an initial food detection image; obtaining a current food detection image; performing a differential fusion operation on the initial food detection image and the current food detection image to obtain a fused food detection image; and inputting the fused food detection image into a predetermined neural network model to obtain the level of doneness of food output by the predetermined neural network model.

In some embodiments, after the obtaining a current food detection image, the method further includes:
obtaining an image size set by the predetermined neural network model;
cropping the initial food detection image and the current food detection image based on the image size;
performing the differential fusion operation on the cropped initial food detection image and the cropped current food detection image to obtain the fused food detection image.

In some embodiments, the cropping the initial food detection image and the current food detection image based on the image size, includes:
performing a predetermined semantic segmentation algorithm to obtain position information of the food in the initial food detection image and in the current food detection image; and
extracting an initial food image from the initial food detection image and a current food image from the current food detection image based on the position information.

In some embodiments, the cropping the initial food detection image and the current food detection image based on the image size, includes:
performing the predetermined semantic segmentation algorithm to obtain the position information from the initial food detection image, and taking the position information in the initial food detection image as the position information in the current food detection image; and
extracting the initial food image from the initial food detection image, and extracting the current food image from the current food detection image, based on the position information.

In some embodiments, the predetermined semantic segmentation algorithm is Mask-RCNN.

In some embodiments, the performing a differential fusion operation on the initial food detection image and the current food detection image to obtain a fused food detection image, includes:
obtaining a pixel value of the initial food detection image and a pixel value of the current food detection image; and
determining a difference value between the pixel value of the initial food detection image and the pixel value of the current food detection image to obtain a pixel value of the fused food detection image.

In some embodiments, the inputting the fused food detection image into a predetermined neural network model to obtain the level of doneness of food output by the predetermined neural network model, includes:
inputting the fused food detection image into the predetermined neural network model to obtain a food changing feature output by the predetermined neural network model; and
performing a predetermined regression method to calculate the food changing feature to obtain the level of doneness of food.

In some embodiments, the predetermined neural network model is EfficientNet, and the predetermined regression method is Logistic regression.

The present disclosure further provides a device for identifying a level of doneness of food, including a memory and a processor coupled to the memory.

The memory is configured to store program data, and the processor is configured to execute the program data to implement the method of identifying a level of doneness of food as mentioned above.

The present disclosure further provides a computer storage medium, configured to store program data. The program data, when being executed by a processor, is configured to implement the method of identifying a level of doneness of food as mentioned above.

The present disclosure further provides a cooking device, including the device for identifying a level of doneness of food as mentioned above.

According to the present disclosure, the device for identifying the level of doneness of food obtains a detection image of a current food; performs differential fusion on a detection image of an initial food and the detection image of the current food to obtain a fused food detection image; and inputs the fused food detection image into a predetermined neural network model to obtain the level of doneness of food output by the predetermined neural network model. According to the method of identifying the level of doneness of food in the present disclosure, the differential image fusion is performed to reduce an influence on determining the level of doneness of food caused by the detection image of the initial food, and costs of the device may be reduced.

BRIEF DESCRIPTION OF THE DRAWINGS

In order to more clearly illustrate the technical solutions in the embodiments of the present disclosure, drawings used in the description of the embodiments will be briefly described in the following. Apparently, the drawings in the following description are only some of the embodiments of the present disclosure, and other drawings can be obtained by an ordinary skilled person in the art based on these drawings without any creative work.

DETAILED DESCRIPTION

Technical solutions of the embodiments of the present disclosure will be clearly and completely described below by referring to the accompanying drawings in the embodiments of the present disclosure. Apparently, the described embodiments are only a part of, but not all of, the embodiments of the present disclosure. Based on the embodiments in the present disclosure, all other embodiments obtained by an ordinary skilled person in the art without making creative work shall fall within the scope of the present disclosure.

Figure 1:
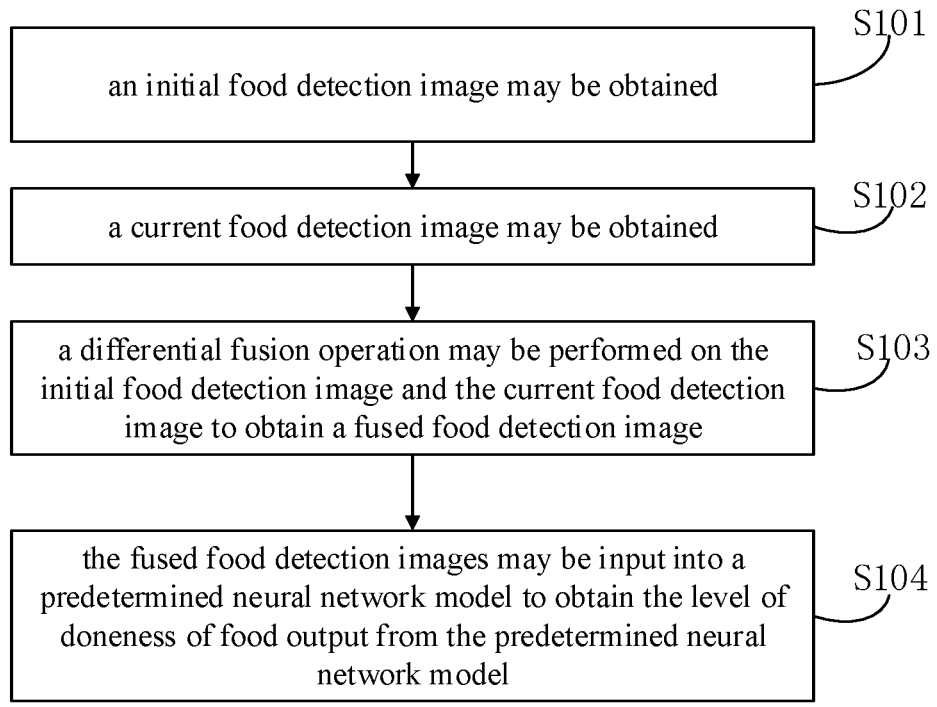
FIG. 1 is a flow chart of a method of identifying a level of doneness of food according to first embodiments of the present disclosure.

In order to solve the problem of low accuracy and high hardware cost of the method for identifying the level of doneness of food in the art, the present disclosure provides a method of identifying the level of doneness of food. In detail, as shown in FIG. 1, FIG. 1 is a flow chart of a method of identifying a level of doneness of food according to first embodiments of the present disclosure. The method of identifying the level of doneness of food provided in the present disclosure is applied to a device for identifying the level of doneness of food.

The device for identifying the level of doneness of food may be a server, a terminal device, or a system in which the server and the terminal device cooperate with each other. Accordingly, each part of the device for identifying the level of doneness of food, such as each unit, each subunit, each module, and each submodule, may be configured in the server, in the terminal device, or in the server and the terminal device respectively.

Further, the above server may be either hardware or software. When the server is the hardware, the server may be implemented as a distributed server cluster including a plurality of servers or implemented as a single server. When the server is the software, the server may be implemented as a plurality of software or software modules, such as software or software modules configured to provide distributed servers, or implemented as a single software or software module. The present disclosure does not limit the form of the server.

To be noted that, while describing the method of identifying the level of doneness of food in the present disclosure, the identification device is a subject that performs operations.

As shown in FIG. 1, the method of identifying the level of doneness of food of the present embodiments includes following operations.

In an operation S101, an initial food detection image may be obtained.

The identification device obtains the initial food detection image by a camera of an intelligent oven. A process of obtaining the initial food detection image includes following operations. The identification device may be electrically connected to a switch module and a camera of the intelligent oven. When the switch module of the intelligent oven is switched on, i.e., when the intelligent oven starts operating, the identification device is informed through the switch module that an operation state of the intelligent oven has changed, controls the camera to capture an image of an interior of the intelligent oven, and take the captured image as the initial food detection image. In other embodiments, the identification device may obtain the initial food detection image from other domestic appliances, such as a refrigerator, a microwave oven, a rice cooker, and so on. The initial food detection image of the present embodiments includes, but is not limited to, a detection image of raw food. In another example, the identification device may take an image of a state of the food when the intelligent oven just starts operating as the initial food detection image. In other embodiments, the identification device may set a predetermined time point. When the identification device is informed that the operating state of the intelligent oven has changed, the identification device may capture the image of the interior of the intelligent oven after the predetermined time point and take the captured image as the initial food detection image.

In an operation S102, a current food detection image may be obtained.

The identification device may obtain the current food detection image through the same camera of the intelligent oven. A process of obtaining the current food detection image includes following operations. The identification device may be electrically connected to the detection module of the intelligent oven. When the detection module of the intelligent oven receives a detection command, the detection module sends the detection command to the identification device, and the recognition device controls the camera to capture an image of the interior of the intelligent oven and takes the captured image as the current food detection image.

In an operation S103, a differential fusion operation may be performed on the initial food detection image and the current food detection image to obtain a fused food detection image.

An image fusion device may perform the differential fusion operation on the initial food detection image and the current food detection image, and may preprocess the initial food detection image and the current food detection image to enable a shape, a position, and an image size of the initial food detection image to be the same as a shape, a position, and an image size of the current food detection image. In this way, an efficiency and accuracy of model learning may be improved effectively.

Since the identification device needs to reduce an influence caused by the initial food detection image, the identification device performs the differential fusion operation on food at different cooking time points and the original raw food. In this way, subsequently, the neural network model captures a change of the food before and after the cooking, reducing an influence caused by various preparation methods performed on the food and various color shades of the food.

In detail, the identification device performs the differential fusion operation on the initial food detection image and the current food detection image to obtain a fused food detection image. The identification device obtains a pixel value of the initial food detection image and a pixel value of the current food detection image, and obtains a value difference between the pixel value of the initial food detection image and the pixel value of the current food detection image to obtain a pixel value of the fused food detection image.

When the identification device obtains the pixel value of the initial food detection image and the pixel value of the current food detection image, the identification device may firstly determine whether a format of the pixel value of the initial food detection image is the same as a format of the pixel value of the current food detection image. In response to the format of the pixel value of the initial food detection image being not the same as the format of the pixel value of the current food detection image, the identification device may convert the formats according to a predetermined image format, and the predetermined image format may be an RGB color format.

In the present embodiments, the pixel value of the initial food detection image may be an RGB color channel of the initial image detection image, and the pixel value of the current food detection image may be an RGB color channel of the current food detection image. The identification device subtracts the RGB color channel of the current image detection image from the RGB color channel of the initial food detection image to obtain an RGB color channel of the fused food detection image after the differential fusion, i.e., the pixel value of the fused food detection image. In detail, an R color channel of the fused food detection image is a difference value between an R color channel of the initial food detection image and an R color channel of the current food detection image. A G color channel of the fused food detection image is a difference value between a G color channel of the initial food detection image and a G color channel of the current food detection image. A B color channel of the fused food detection image is a difference value between a B color channel of the initial food detection image and a B color channel of the current food detection image.

In some embodiments, the identification device may take other types of color data for performing the differential fusion operation, which will not be described here.

In an operation S104, the fused food detection images may be input into a predetermined neural network model to obtain the level of doneness of food output from the predetermined neural network model.

The identification device inputs the fused food detection image into a predetermined deep neural network model. After the predetermined deep neural network model captures a changing feature of the food, regression is performed based on the changing feature of the food to obtain data of the level of doneness of the food.

Further, while the method of identifying the level of doneness of food is learning a model of the level of doneness of food, the device selects images of various time points to be differentially fused and inputs the selected images to the deep neural network model, instead of directly learning and performing the identification based on the images of the various time points. In this way, the accuracy of the method of identifying the level of doneness of food may be improved.

In detail, according to the present disclosure, the differential fusion operation is performed on the initial food detection image and the current food detection image, robustness of the deep neural network model for different representations of the food and the food coated by various sauces may be enhanced. Reasons for the robustness may be as follows.

In terms of colors, generally the higher level of doneness the food is, the darker the color may be. However, depending on methods of cooking the food and sauces coated on the food, the cooked food may show various shades of colors. When an input to the network for identifying the level of doneness was not the differential fusion of the initial food detection image and the current food detection image, but was only the current food detection image, the model is prone to learn a conclusion that a darker color indicates a higher level of doneness. In this way, a raw food image may be easily determined as the food in the higher level of doneness when the raw food is coated with a dark sauce. However, when the two images are differentially fused, the model may pay more attention to a direct color texture change in the food image at corresponding positions at various time points.

In terms of shapes, deformation of the food while cooking is significant information to determine the level of doneness of food. Many foods undergo deformation at various levels of doneness. For example, a shrimp may be bent when it is cooked, and a cake may expand and shrink subsequently while cooking. When only the current food detection image is input, the model is not informed whether the food has undergone deformation. However, after the differential fusion operation is performed on the initial food detection image and the current food detection image, the model may compare the initial food detection image and the current food detection image to infer a shape change, facilitating the determination of the level of doneness of food.

In the present embodiments, the identification device obtains the initial food detection image; obtains the current food detection image; performs the differential fusion operation on the initial food detection image and the current food detection image to obtain the fused food detection image, and inputs the fused food detection image into the predetermined neural network model to obtain the level of doneness of food output by the predetermined neural network model. According to the method of identifying the level of doneness of food in the present disclosure, the differential image fusion is performed to reduce the influence on determining the level of doneness of food caused by the initial food detection image, and costs of the device may be reduced.

Figure 2:
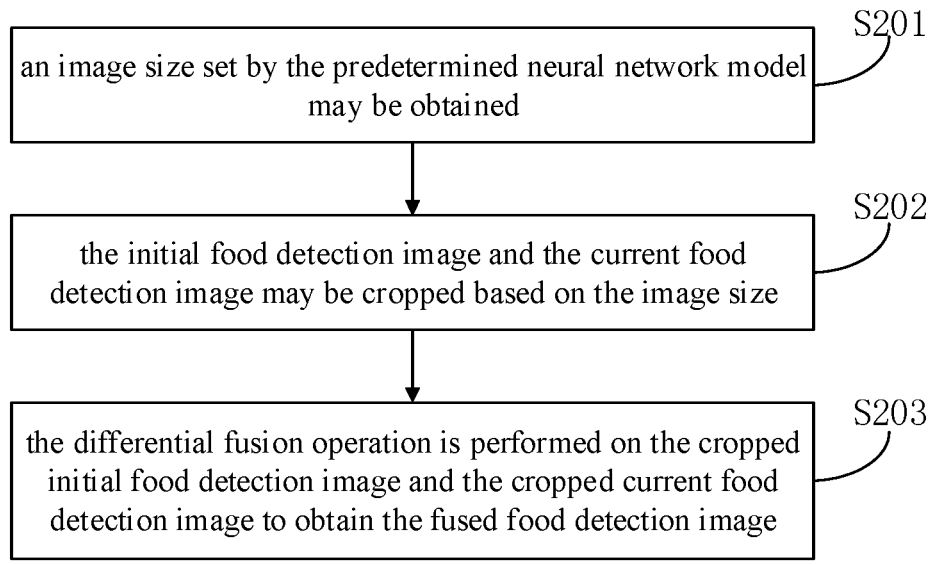
FIG. 2 is a flow chart of a method of identifying a level of doneness of food according to second embodiments of the present disclosure.

After the operation S102 in the embodiments shown in FIG. 1, the present disclosure further provides another method of identifying the level of doneness of food. As shown in FIG. 2, FIG. 2 is a flow chart of a method of identifying a level of doneness of food according to second embodiments of the present disclosure.

As shown in FIG. 2, the method of identifying the level of doneness of food in the present embodiments includes following operations.

In an operation S201, an image size set by the predetermined neural network model may be obtained.

The food detection image obtained by the identification device includes a large amount of information that is irrelevant to the food, such as a container in which the food is loaded, and the like. Further, some redundant sauces may be present while cooking the food. Alternatively, some juice may be generated and float out of the food while the food being cooked. When the identification device takes the entire food detection image as the input to the neural network model, a large amount of redundant information may interfere with the model learning and feature extraction. Therefore, the identification device may obtain the image size set by the predetermined neural network model and take the image size as a condition for subsequently processing the food detection image.

In an operation S202, the initial food detection image and the current food detection image may be cropped based on the image size.

Since, without changing a size of the neural network model, when the image size set by the predetermined neural network model is smaller than a size of the food detection image captured by the camera of the intelligent oven, the identification device needs to reduce the size of the food detection image as a whole when the entire initial food detection image and/or the current food detection image is to be input. In this way, resolution of the image may be reduced. Details of the food in the food detection image are critical for determining the level of doneness, and therefore, the identification device of the present embodiments needs to crop the initial food detection image and the current food detection image based on the image size set by the predetermined neural network model. For example, the identification device may segment an individual food from the food detection image, resolution of the initial food image may be taken as resolution of the image input to the neural network model, ensuring that the details of the food are input into the neural network model, improving the accuracy of the method of identifying the level of doneness of food.

In detail, the identification device may take a predetermined semantic segmentation algorithm to obtain position information of the food in the initial food detection image and in the current food detection image. Further, the identification device extracts an initial food image from the initial food detection image and a current food image from the current food detection image based on the position information of the food. The predetermined semantic segmentation algorithm performed in the present embodiments may be Mask-RCNN or other segmentation algorithms, which will not be described here. The present disclosure does not limit the method of obtaining the position information of the food. The method may perform the predefined semantic segmentation algorithm to segment the food image from the food detection image, or perform a background difference operation, a target detection operation, and the like, to obtain the position information of the food.

In the present embodiments, the identification device may firstly extract the position information of the food in the initial food detection image and take the position information as a position template. Further, the identification device may directly apply the position template to the current food detection image in real time, such that the identification device may extract the current food image from the current food detection image. In this way, a processing load of the identification device may be effectively reduced, and an identification efficiency may be improved. In other embodiments, the identification device may extract the position information from the initial food detection image and the current food detection image, respectively.

In an operation S203, the differential fusion operation is performed on the cropped initial food detection image and the cropped current food detection image to obtain the fused food detection image.

The operation S203 of the present embodiments may be the same as the operation S103 in the embodiments shown in FIG. 1 and will not be repeated here.

Figure 3:
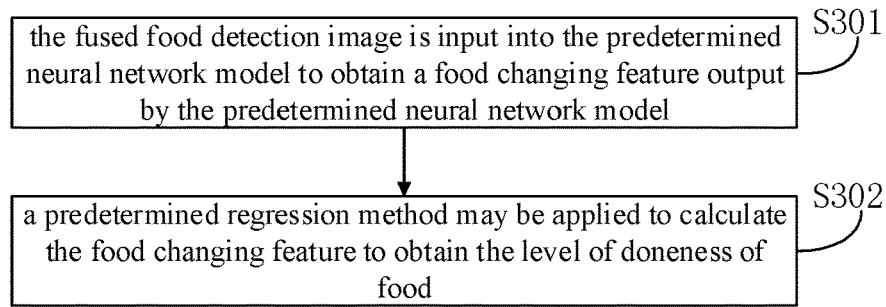
FIG. 3 is a flow chart of a method of identifying a level of doneness of food according to third embodiments of the present disclosure.

For the operation S104 in the embodiments shown in FIG. 1, the present disclosure further provides another method of identifying the level of doneness of food. As shown in FIG. 3, FIG. 3 is a flow chart of a method of identifying a level of doneness of food according to third embodiments of the present disclosure.

As shown in FIG. 3, the method of identifying the level of doneness of food in the present embodiments includes following operations.

In an operation S301, the fused food detection image is input into the predetermined neural network model to obtain a food changing feature output by the predetermined neural network model.

The identification device inputs the fused food detection image obtained in the above embodiments into the predetermined neural network model to extract a food feature of the fused food detection image through the predetermined neural network model.

In detail, the identification device fuses the food detection images to analyze a direct color texture change shown in the food images at a corresponding position at two time points and a shape change shown in the food images at the corresponding position at two time points, which facilitates the determination about the level of doneness of food.

The predetermined neural network model in the present embodiments may be the EfficientNet or other neural network models for image feature extraction, which will not be described here.

In an operation S302, a predetermined regression method may be applied to calculate the food changing feature to obtain the level of doneness of food.

The identification device applies the predetermined regression method to calculate the food changing feature extracted in the operation S301 to obtain the level of doneness of food. The level of doneness of food in the present embodiments may be represented as a doneness level of the food. For example, the doneness level of the food may be classified into 0 to 19 levels, with a total of 20 levels. The higher the doneness level, the more cooked the food tends to be. In other embodiments, the level of doneness of food may also be reflected as a doneness value of the food. For example, the doneness value may be divided into 0 to 100. The higher the value, the more cooked the food tends to be.

The regression method applied in the present embodiments may be Logistic regression or other regression methods, which will not be described here.

Figure 4:
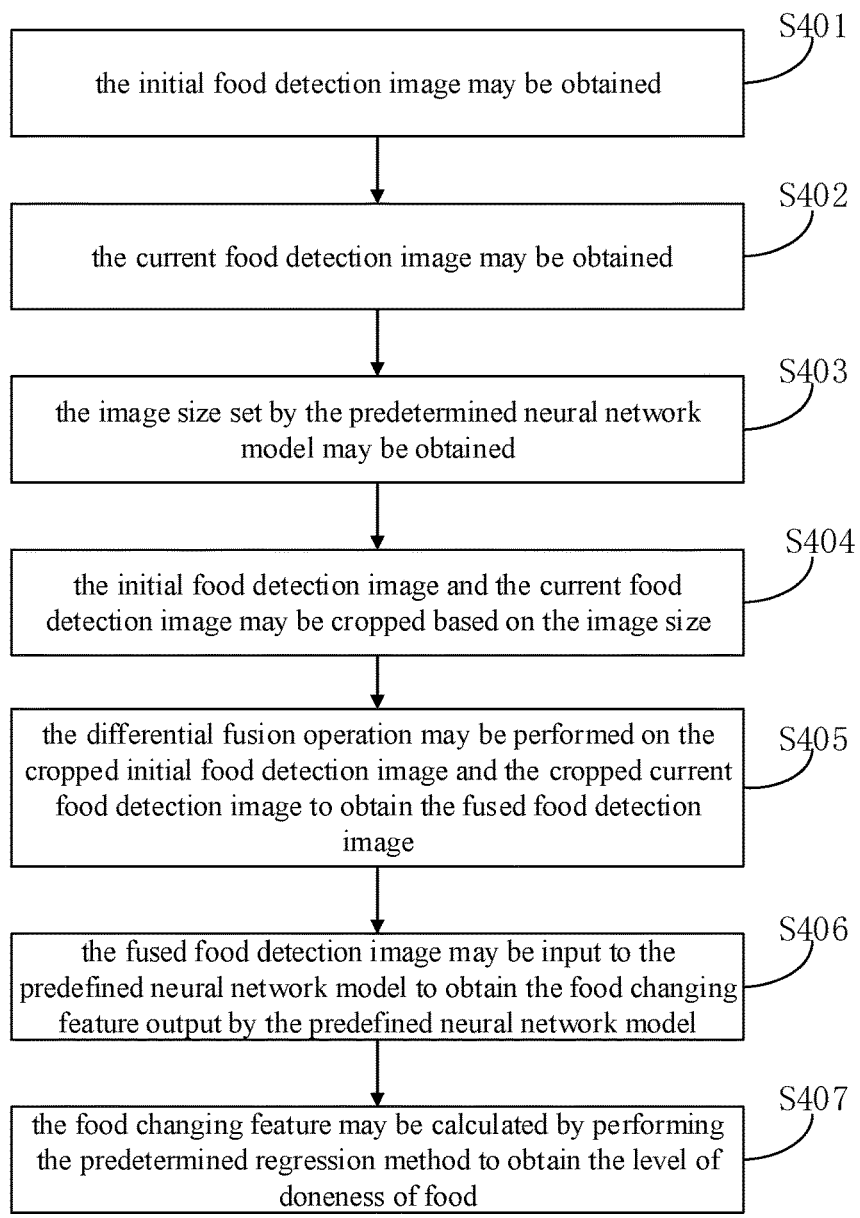
FIG. 4 is a flow chart of a method of identifying a level of doneness of food according to fourth embodiments of the present disclosure.

In order to solve the problem of low accuracy and high hardware cost of the method for identifying the level of doneness of food in the art, the present disclosure provides another method of identifying the level of doneness of food. As shown in FIG. 4, FIG. 4 is a flow chart of a method of identifying a level of doneness of food according to fourth embodiments of the present disclosure.

As shown in FIG. 4, the method of identifying the level of doneness of food in the present embodiments includes following operations.

In an operation S401, the initial food detection image may be obtained.

In an operation S402, the current food detection image may be obtained.

In an operation S403, the image size set by the predetermined neural network model may be obtained.

In an operation S404, the initial food detection image and the current food detection image may be cropped based on the image size.

In an operation S405, the differential fusion operation may be performed on the cropped initial food detection image and the cropped current food detection image to obtain the fused food detection image.

In an operation S406, the fused food detection image may be input to the predefined neural network model to obtain the food changing feature output by the predefined neural network model.

In an operation S407, the food changing feature may be calculated by performing the predetermined regression method to obtain the level of doneness of food.

Figure 5:
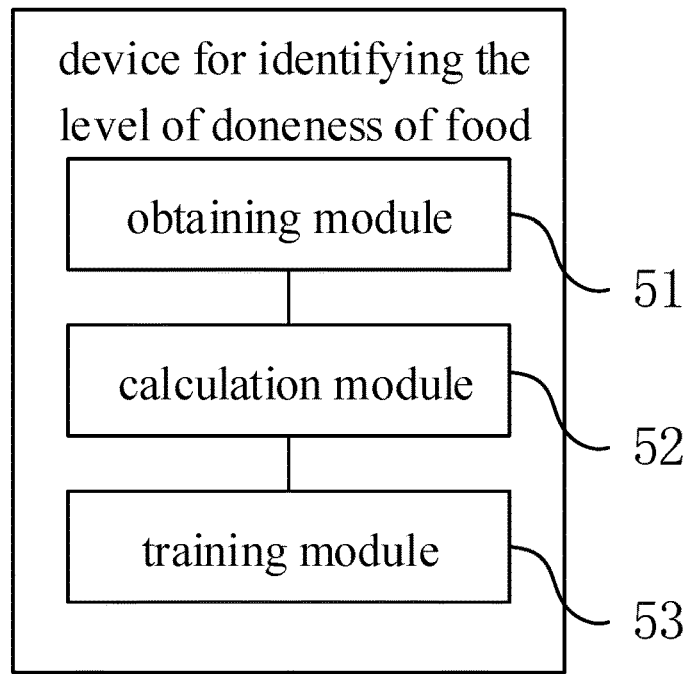
FIG. 5 is a structural schematic view of a device for identifying a level of doneness of food according to some embodiments of the present disclosure.

In order to perform the above-mentioned method of identifying the level of doneness of food, the present disclosure also provides a device for identifying the level of doneness of food, as shown in FIG. 5. FIG. 5 is a structural schematic view of a device for identifying a level of doneness of food according to embodiments of the present disclosure.

As shown in FIG. 5, the device for identifying the level of doneness of food includes an obtaining module 51, a calculation module 52 and a training module 53.

The obtaining module 51 is configured to obtain the initial food detection image and configured to the current food detection image.

The calculation module 52 is configured to perform the differential fusion operation on the initial food detection image and the current food detection image to obtain the fused food detection image.

The training module 53 is configured to input the fused food detection image to the predetermined neural network model to obtain the level of doneness of food output by the predetermined neural network model.

Figure 6:
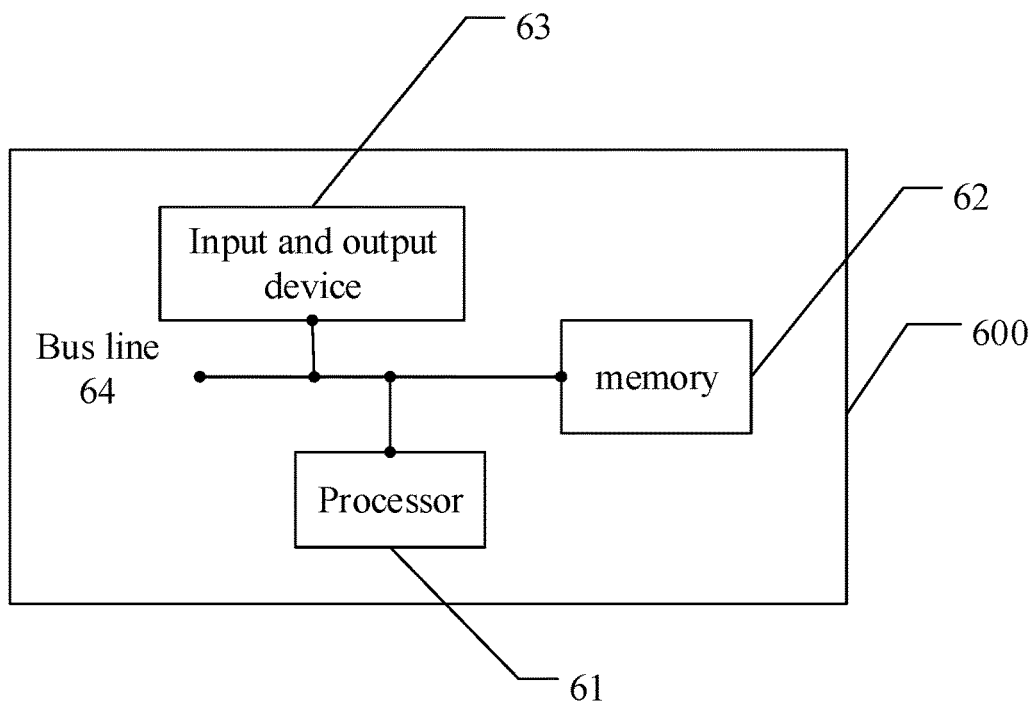
FIG. 6 is a structural schematic view of a device for identifying a level of doneness of food according to some embodiments of the present disclosure.

In order to achieve the above method of identifying the level of doneness of food, the present disclosure also provides another device for identifying the level of doneness of food, as shown in FIG. 6. FIG. 6 is a structural schematic view of a device for identifying a level of doneness of food according to some embodiments of the present disclosure.

As shown in FIG. 6, the device 600 for identifying the level of doneness of food in the present embodiments includes a processor 61, a memory 62, an input and output device 63, and a bus 64.

Each of the processor 61, the memory 62, and the input and output device 63 is connected to the bus 64. The memory 62 stores a computer program, and the processor 61 is configured to execute the computer program to implement the method of identifying the level of doneness of food described in the above embodiments.

In the present embodiments, the processor 61 may be referred to as a Central Processing Unit (CPU). The processor 61 may be an integrated circuit chip with signal processing capabilities. The processor 61 may be a general-purpose processor, a digital signal processor (DSP), an application specific integrated circuit (ASIC), a field programmable gate array (FPGA) or other programmable logic devices, a discrete gate or transistor logic device, or a discrete hardware component. The general-purpose processor may be a microprocessor, or the processor 61 may be any conventional processor and the like.

Figure 7:
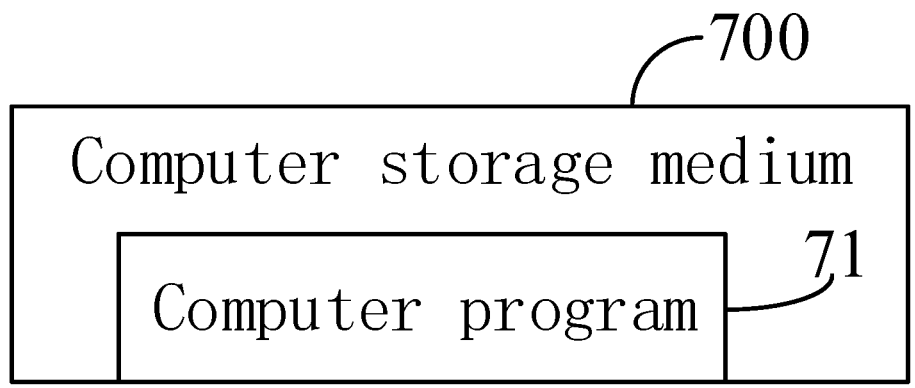
FIG. 7 is a structural schematic view of a computer storage medium according to some embodiments of the present disclosure.

The present disclosure also provides a computer storage medium, as shown in FIG. 7. The computer storage medium 700 is configured to store a computer program 71, and the computer program 71, when being executed by a processor, is configured to implement the method as described in the embodiments of the method of identifying the level of doneness of food provided in the present disclosure.

The method involved in the embodiments of the method of identifying the level of doneness of food, when being implemented, may be in a form of a software functional unit and sold or used as an independent product, and may be stored in a device, such as a computer readable storage medium. It shall be understood that the technical solution of the present disclosure or all or part of the technical solution that essentially contributes to the art may be implemented in the form of the software product and stored in a storage medium. The technical solution includes a number of instructions to enable a computer device (which may be a personal computer, a server, or a network device, and so on) or a processor to perform all or some of the operations of the method described in various embodiments of the present disclosure. The aforementioned storage medium includes: a USB disk, a mobile hard disk, Read-Only Memory (ROM), Random Access Memory (RAM), a magnetic disk or an optical disk, and various other media that can store program codes.

Figure 8:
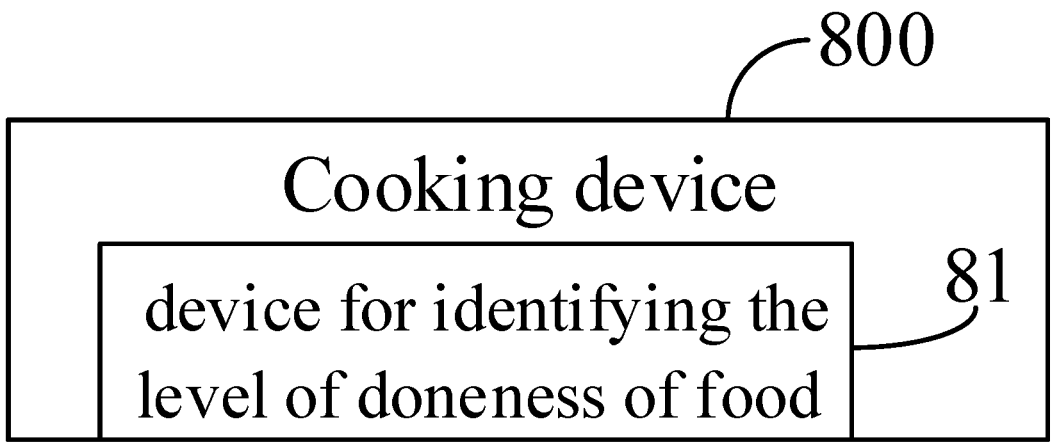
FIG. 8 is a structural schematic view of a cooking device according to some embodiments of the present disclosure.

The present disclosure also provides a cooking device, as shown in FIG. 8. The cooking device 800 includes a device 81 for identifying the level of doneness of food as shown in the above embodiments.

The above is only an implementation of the present disclosure, and does not limit the scope of the present disclosure. Any equivalent structure or equivalent process transformation made based on the specification and the accompanying drawings of the present disclosure, applied directly or indirectly in other related technical fields, shall be included in the scope of the present disclosure.

What is claimed is:

1. A method of identifying a level of doneness of food, comprising:
   obtaining an initial food detection image;
   obtaining a current food detection image;
   performing a differential fusion operation on the initial food detection image and the current food detection image to obtain a fused food detection image, wherein the performing a differential fusion operation on the initial food detection image and the current food detection image to obtain a fused food detection image comprises:
   obtaining a pixel value of the initial food detection image and a pixel value of the current food detection image; and
   determining a difference value between the pixel value of the initial food detection image and the pixel value of the current food detection image to obtain a pixel value of the fused food detection image; and
inputting the fused food detection image into a predetermined neural network model to obtain the level of doneness of food as an output of the predetermined neural network model.

2. The method of identifying a level of doneness of food according to claim 1, wherein after the obtaining a current food detection image, the method further comprises:
   obtaining an image size set by the predetermined neural network model;
   cropping the initial food detection image and the current food detection image based on the image size; and
   performing the differential fusion operation on the cropped initial food detection image and the cropped current food detection image to obtain the fused food detection image.

3. The method of identifying a level of doneness of food according to claim 2, wherein the cropping the initial food detection image and the current food detection image based on the image size, comprises:
   performing a predetermined semantic segmentation algorithm to obtain position information of the food in the initial food detection image and in the current food detection image; and
   extracting an initial food image from the initial food detection image and a current food image from the current food detection image based on the position information.

4. The method of identifying a level of doneness of food according to claim 3, wherein the cropping the initial food detection image and the current food detection image based on the image size, comprises:
   performing the predetermined semantic segmentation algorithm to obtain the position information from the initial food detection image, and taking the position information in the initial food detection image as the position information in the current food detection image; and
   extracting the initial food image from the initial food detection image, and extracting the current food image from the current food detection image, based on the position information.

5. The method of identifying a level of doneness of food according to claim 4, wherein the predetermined semantic segmentation algorithm is Mask-RCNN.

6. The method of identifying a level of doneness of food according to claim 1, wherein the inputting the fused food detection image into a predetermined neural network model to obtain the level of doneness of food as an output of the predetermined neural network model, comprises:
   inputting the fused food detection image into the predetermined neural network model to obtain a food changing feature output by the predetermined neural network model; and
   performing a predetermined regression method to calculate the food changing feature to obtain the level of doneness of food.

7. The method of identifying a level of doneness of food according to claim 6, wherein the predetermined neural network model is EfficientNet, and the predetermined regression method is Logistic regression.

8. A device for identifying a level of doneness of food, comprising a memory and a processor coupled to the memory;
   wherein the memory is configured to store program data, and the processor is configured to execute the program data to implement operations of:
   obtaining an initial food detection image;
   obtaining a current food detection image;
   performing a differential fusion operation on the initial food detection image and the current food detection image to obtain a fused food detection image, wherein the performing a differential fusion operation on the initial food detection image and the current food detection image to obtain a fused food detection image comprises:
      obtaining a pixel value of the initial food detection image and a pixel value of the current food detection image; and
      determining a difference value between the pixel value of the initial food detection image and the pixel value of the current food detection image to obtain a pixel value of the fused food detection image; and
   inputting the fused food detection image into a predetermined neural network model to obtain the level of doneness of food output by the predetermined neural network model.

9. The device for identifying a level of doneness of food according to claim 8, wherein after obtaining the current food detection image, the processor is further configured to implement operations of:
   obtaining an image size set by the predetermined neural network model;
   cropping the initial food detection image and the current food detection image based on the image size; and
   performing the differential fusion operation on the cropped initial food detection image and the cropped current food detection image to obtain the fused food detection image.

10. The device for identifying a level of doneness of food according to claim 9, wherein while cropping the initial food detection image and the current food detection image based on the image size, the processor is configured to implement operations of:
   performing a predetermined semantic segmentation algorithm to obtain position information of the food in the initial food detection image and in the current food detection image; and
   extracting an initial food image from the initial food detection image and a current food image from the current food detection image based on the position information.

11. The device for identifying a level of doneness of food according to claim 10, wherein while cropping the initial food detection image and the current food detection image based on the image size, the processor is configured to implement operations of:
   performing the predetermined semantic segmentation algorithm to obtain the position information from the initial food detection image, and taking the position information in the initial food detection image as the position information in the current food detection image; and extracting the initial food image from the initial food detection image, and extracting the current food image from the current food detection image, based on the position information.

12. The device for identifying a level of doneness of food according to claim 8, wherein while inputting the fused food detection image into a predetermined neural network model to obtain the level of doneness of food output by the predetermined neural network model, the processor is configured to implement operations of:
   inputting the fused food detection image into the predetermined neural network model to obtain a food changing feature output by the predetermined neural network model; and
   performing a predetermined regression method to calculate the food changing feature to obtain the level of doneness of food.

13. A cooking device, comprising a device for identifying a level of doneness of food, wherein the device for identifying the level of doneness of food comprises a memory and a processor coupled to the memory; and
   the memory is configured to store program data, and the processor is configured to execute the program data to implement operations of:
   obtaining an initial food detection image;
   obtaining a current food detection image;
   performing a differential fusion operation on the initial food detection image and the current food detection image to obtain a fused food detection image, wherein the performing a differential fusion operation on the initial food detection image and the current food detection image to obtain a fused food detection image comprises:
      obtaining a pixel value of the initial food detection image and a pixel value of the current food detection image; and
      determining a difference value between the pixel value of the initial food detection image and the pixel value of the current food detection image to obtain a pixel value of the fused food detection image; and
   inputting the fused food detection image into a predetermined neural network model to obtain the level of doneness of food output by the predetermined neural network model.

14. The cooking device according to claim 13, wherein after obtaining the current food detection image, the processor is further configured to implement operations of:
   obtaining an image size set by the predetermined neural network model;
   cropping the initial food detection image and the current food detection image based on the image size; and
   performing the differential fusion operation on the cropped initial food detection image and the cropped current food detection image to obtain the fused food detection image.

15. The cooking device according to claim 14, wherein while cropping the initial food detection image and the current food detection image based on the image size, the processor is configured to implement operations of:
   performing a predetermined semantic segmentation algorithm to obtain position information of the food in the initial food detection image and in the current food detection image; and
   extracting an initial food image from the initial food detection image and a current food image from the current food detection image based on the position information.

16. The cooking device according to claim 15, wherein while cropping the initial food detection image and the current food detection image based on the image size, the processor is configured to implement operations of:
   performing the predetermined semantic segmentation algorithm to obtain the position information from the initial food detection image, and taking the position information in the initial food detection image as the position information in the current food detection image; and
   extracting the initial food image from the initial food detection image, and extracting the current food image from the current food detection image, based on the position information.

17. The cooking device according to claim 13, wherein while inputting the fused food detection image into a predetermined neural network model to obtain the level of doneness of food output by the predetermined neural network model, the processor is configured to implement operations of:
   inputting the fused food detection image into the predetermined neural network model to obtain a food changing feature output by the predetermined neural network model; and performing a predetermined regression method to calculate the food changing feature to obtain the level of doneness of food.

* * * * *